UNITED STATES PATENT OFFICE.

EVERARD STEELE, OF PENRHYNDEUDRAETH, ENGLAND, ASSIGNOR TO MORITZ STACH VON GOLTZHEIM, OF NEW YORK, N. Y.

PROCESS OF PRODUCING PLASTIC EXPLOSIVES.

No. 902,619.  Specification of Letters Patent.  Patented Nov. 3, 1908.

Application filed April 11, 1908. Serial No. 426,418.

*To all whom it may concern:*

Be it known that I, EVERARD STEELE, a citizen of the United States, residing at Penrhyndeudraeth, North Wales, England, Great Britain, have invented a new and Improved Process of Producing Plastic Explosives, of which the following is a specification.

This invention relates to a novel process for producing a granulated plastic safety explosive, which is indifferent to the action of moisture. By its plastic properties, the explosive is more particularly adapted for charging over-head holes in mines and in similar underground work.

In carrying out the invention, I employ a finely powdered nitrated organic substance which is insoluble in water, while it is readily soluble in a volatile liquid, such as alcohol, benzene, etc. This nitrated substance which may be produced in any suitable manner, is mixed with an oxidizing substance, such as a chlorate, perchlorate, nitrate, permanganate of potassium, etc., also reduced to a fine powder. After these ingredients have been carefully mixed, they are treated with a volatile liquid, such as alcohol, benzene, etc., adapted to dissolve the nitrated substance, to which liquid had been previously added a small quantity of an oil in which the nitrated substance hereinabove referred to is also soluble. The above liquid mixture is applied to the powder in such a limited quantity as is just sufficient to bring the soluble nitrated organic substance to a semi-liquid condition. For this purpose, I spread a thin layer of the ready made powder upon a suitable support and apply the liquid mixture to the powder by means of a sprayer. In this way the oily mixture is finely divided and uniformly distributed in the powder, while the use of excessive quantities of the liquid is prevented. The semi-liquid solution of the oxidizable substance thus obtained, will, owing to adhesion, envelop the particles of the insoluble oxidizing substance forming fine granules of the explosive, which, under the microscope, show a crystalline structure, but when pressed, will cling to each other and readily take any desired form. In this way a granular explosive is obtained which is at the same time sufficiently plastic to permit miners to press it into overhead holes.

In carrying out my process, 50—90% of powdered resin are mixed with 50—10% of powdered cereal starch or flour, the exact proportions taken depending upon the quickness of the powder desired. This mixture is immersed in nitric acid of about 42° Baumé. After the product has attained a state of full chemical action, it is removed from the acid bath and is suddenly immersed in cold water. After cooling, the product is removed from the water, is pulverized, washed in cold water and dried.

Ten to twenty-five parts of the powder thus obtained are mixed with ninety to seventy-five parts of an oxidizing agent, such as a chlorate, perchlorate, nitrate or permanganate of potassium. After these components have been thoroughly mixed, they are sprayed, while gently agitated, with alcohol, to which had previously been added one-fourth to five per cent. of an oil in which the nitrated substances are soluble, such as castor oil. As the alcohol readily volatilizes, the remaining oily oxidizable substance will form a pasty coating for the granulated oxidizing particles, so that a plastic waterproof explosive is produced.

Example: Twenty parts of resin are mixed with five parts of a vegetable meal, such as starch, and the mixture is then oxidized. Twenty-five parts of this oxidized mixture are then mixed with seventy-five parts of powdered chlorate of potassium. A second mixture is prepared consisting of one part of castor oil and twenty parts of alcohol. This mixture is sprayed by means of a suitable atomizer upon the solid powder which has previously been spread out into a thin layer, and which is gently agitated. The alcohol is allowed to volatilize, while the oil, in conjunction with the oxidizable substances, will form the desired plastic coating for the oxidizing particles.

It will be seen that by my invention the oxidizable substance of the explosive which is indifferent to the action of moisture, is brought into such a condition as to most effectively exclude the moisture of the atmosphere, etc., from the oxidizing substance, which otherwise would readily absorb said moisture. At the same time an effective explosive is produced which contains a homogeneous mixture of the explosive components in a plastic state, so that the same may be readily charged into over-head blast holes.

I claim:

Process of producing a plastic explosive which consists in forming a mixture of a pulverized inorganic oxidizing agent with a pulverized readily oxidizable organic substance insoluble in water but soluble in alcohol, spraying said mixture with a solution of alcohol and castor oil to thereby dissolve the oxidizable substance, and then causing the alcohol to volatilize so that the oil together with the oxidizable substance forms a plastic waterproof coating upon the particles of oxidizing agent, substantially as specified.

Signed by me at Liverpool, England, this thirteenth day of January 1908.

EVERARD STEELE.

Witnesses:
H. WATSON,
W. E. McMULLEN.